United States Patent [19]

Fan

[11] Patent Number: 5,533,144
[45] Date of Patent: Jul. 2, 1996

[54] ANTI-COUNTERFEIT PATTERN DETECTOR AND METHOD

[75] Inventor: Zhigang Fan, Webster, N.Y.

[73] Assignee: Xerox Corporation, Stamford, Conn.

[21] Appl. No.: 323,652

[22] Filed: Oct. 17, 1994

[51] Int. Cl.⁶ ..................................................... G06K 9/00
[52] U.S. Cl. ...................... 382/135; 382/199; 382/209; 382/287; 382/288
[58] Field of Search .................................... 382/135, 199, 382/200, 209, 217, 218, 219, 266, 267, 278, 286, 287, 288, 289, 290, 291, 292; 355/201

[56] References Cited

U.S. PATENT DOCUMENTS 4,153,897   5/1979   Yasuda et al. ............................ 382/218
5,216,724   6/1993   Suzuki et al. ............................ 382/289

Primary Examiner—Leo Boudreau
Assistant Examiner—Phuoc Tran
Attorney, Agent, or Firm—Oliff & Berridge

[57] ABSTRACT

An anti-counterfeit detector and method for identifying whether a platen image portion to be photocopied contains one or several pre-selected monetary note patterns. The detection is performed in a rotation and shift invariant manner. Specifically, the pattern can be of any orientation and at any location of the image. Moreover, it can be embedded in any complicated image background.

14 Claims, 4 Drawing Sheets

ANTI-COUNTERFEIT PATTERN DETECTOR AND METHOD

BACKGROUND OF THE INVENTION

The present invention relates to an anti-counterfeit detector and method for identifying whether an image to be photocopied contains one or several pre-selected monetary note patterns.

Preventing color copiers from being misused for counterfeiting has currently drawn more and more attention. In determining whether a color copier is being used for counterfeiting, a detector compares a known currency image with an image being copied. A problem arises in that it is difficult to detect the patterns in a rotation and shift invariant manner. Specifically, the pattern could be of any orientation and at any location on the image. The orientation and the location of the note can be relatively simple to obtain in the case of a single note with a plain background. However, it is difficult to obtain orientation and location if multiple notes are involved and/or the notes are embedded in some complicated image background.

SUMMARY OF THE INVENTION

It is therefore an object of the present invention to provide an anti-counterfeit pattern detector that detects patterns in a rotation and shift invariant manner.

It is a further object of the present invention to provide greater accuracy and lower analysis time for the currency detection and orientation detection process.

The present invention achieves these and other objects and advantages by providing a memory for storing a plurality of templates, each of the plurality of templates comprising at least one predetermined anchor point; examining structure for examining a portion of the image to be photocopied and for determining whether the portion contains a detected anchor point; orientation determining structure for determining an orientation of the detected anchor point; and matching structure for comparing the plurality of templates to the portion in accordance with the orientation of the detected anchor point.

A method is also disclosed.

BRIEF DESCRIPTION OF THE DRAWINGS

These and other aspects of the present invention will become apparent from the following detailed description of preferred embodiments when taken in conjunction with the accompanying drawings, in which.

DETAILED DESCRIPTION OF PREFERRED EMBODIMENTS

The following detailed description of preferred embodiments is applicable to numerous detection and imaging systems as would be contemplated by those of ordinary skill.

The invention will be described with general reference to FIG. 3.

In order to detect whether a color copier is being used for counterfeiting, the detector 1 is first trained off-line with example notes. A template is created by an initial sampling of currencies (hereinafter template) suspected of being photocopied and counterfeited. Conventional sampling is preferably performed in a low resolution.

The training includes sampling the templates and selecting one or several anchor points. Only those pixels on relatively straight edges, preferably long straight edges, are qualified to be anchor points. Anchor points are used to determine the edge orientation of the unknown document or documents and orient the template accordingly (discussed below). There is no set limit as to the number of possible anchor points in each template. The greater the number of preselected anchor points, the higher the detection accuracy, but the more time of analysis.

One-dollar bills may be sampled at 16 dpi and 32 dpi, respectively. That resolution is sufficient to make a positive determination of the presence of currency when the template is compared with the image being photocopied. The template is stored in a computer memory 26 (FIG. 2) for future image comparison with the unknown document.

Figure 2:
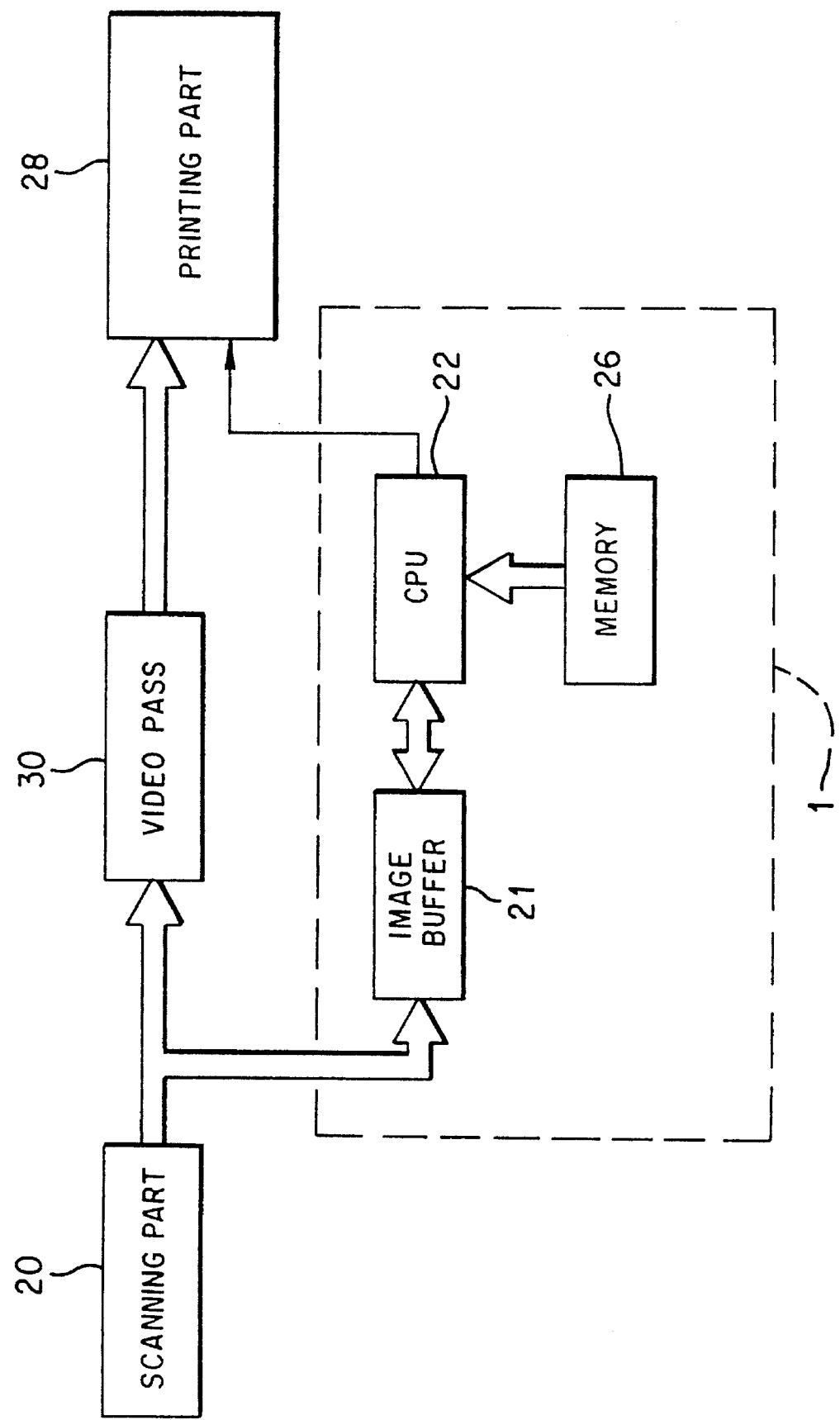
FIG. 2 is a block diagram of the system of the invention.

The detecting of currency notes placed on a platen will now be described. A digital color copier contains functionally a scanning part 20 and a printing part 28 as indicated in FIG. 2. The currency detector 1 is placed in parallel to the normal video pass 30. A data processor (CPU) 22 performs the functions of the detector 1.

When an image of the platen (platen image) containing the unknown document is scanned by the scanning part of the copier, the signal is also sent to the detector 1. The image is sampled using conventional means and at the resolution of the template (FIG. 3, step S1), and stored into the image buffer 21.

The information of a scanned color image is typically organized into three or four channels. The most commonly used sets of channels, or color spaces, are RGB and CIELAB. In RGB, three channels carry red (R), green (G), and blue (B) signals, respectively, while in CIELAB, L* channel represents luminance information, and a* and b* channels represent chromanance information. If RGB space is used, all three channels will be sampled at the same resolution of 16 dpi or 32 dpi. If L*a*b* space is used, a* and b* channels are sampled at a resolution that is half of that of the L* channel. Specifically, L* is sampled at 16 dpi or 32 dpi, and a* and b* are sampled at 8 dpi or 16 dpi.

Figure 3:
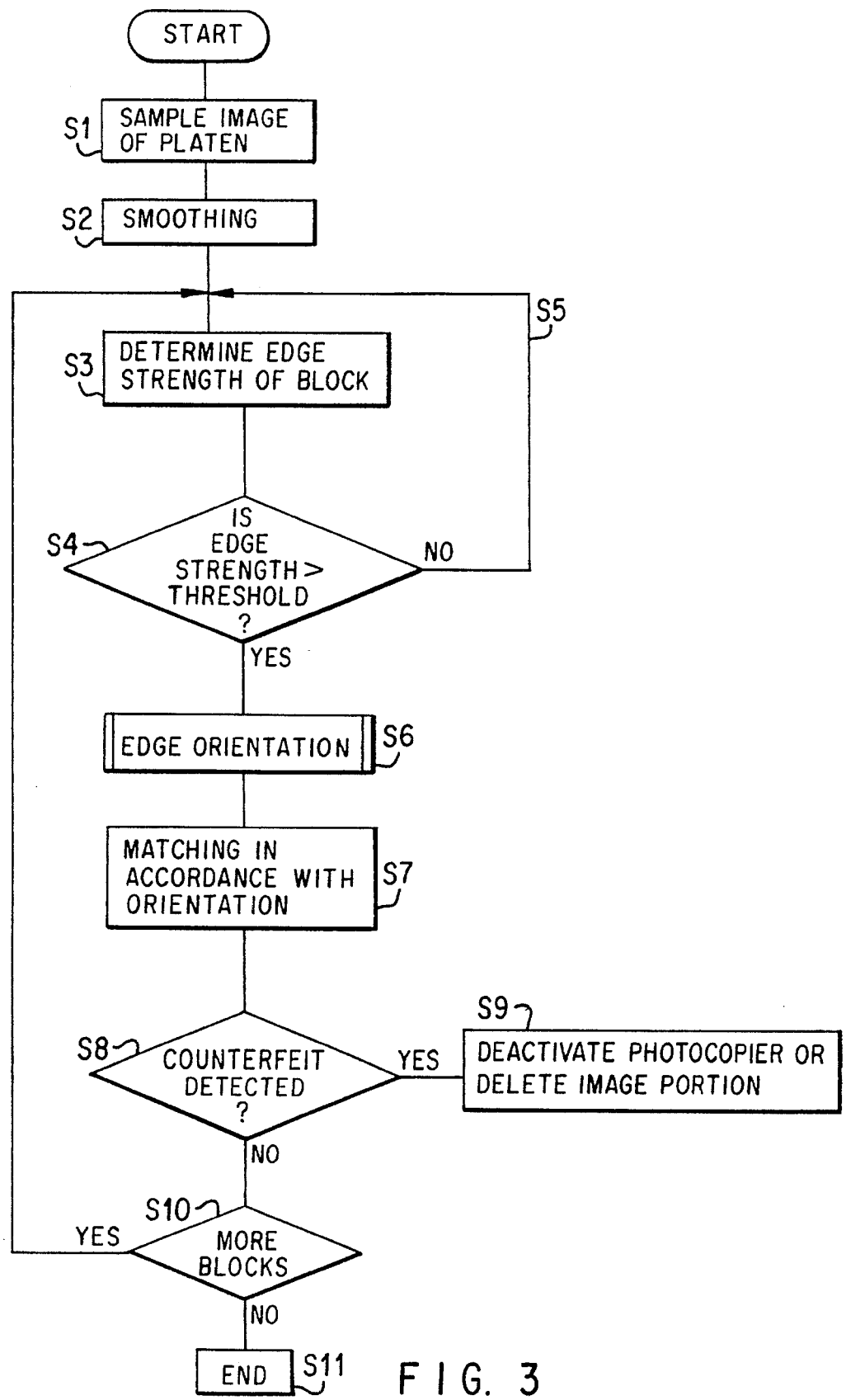
FIG. 3 is a flowchart illustrating the operation in the invention.

After sampling, the color image of the platen is smoothed (FIG. 3, step S2). The process of smoothing entails the averaging of the value of pixels within a given area and reassigning the averaged value to the center pixel. For example, a block area of 3×3 pixels may contain pixels of different value. An average value is obtained for the nine pixels, and is assigned to the center pixel. The reassigned value produces a new version of the platen image providing less prominent fine texture patterns that could otherwise confuse edge detection and orientation estimation (see below).

The smoothed platen image is examined block by block, with a typical block size of 8×8 pixels. The blocks can be overlapping. Each block is examined by the data processor 22 (FIG. 2) to see if it possibly contains a pixel intensity orientation that corresponds to a preselected anchor point on the template. The "quiet blocks" containing little pixel variation, can be initially discarded as an edge is not present within the block (FIG. 3, step S3). For remaining blocks, the orientation of the edges contained in the block is estimated.

The edge strength and orientation estimation is only performed on one of the color channels of the smoothed scanned image. In RGB space it is on G channel, and in CIELAB space it is on L* channel.

The currency images often contain many fine textures that could be mistaken as edges. It is therefore very important to reduce the influence of texture during the edge strength and orientation estimation. The edge strength at a pixel (x,y) is quantified by the following formula:

$$f(x,y)=|d_V|^3(x,y)+|d_H|^3(x,y) \quad (1)$$

where $d_V$ and $d_H$ are differences in intensity of neighboring pixels of the smoothed image in the vertical and horizontal directions, respectively. The formula emphasizes strong differences, which typically characterize edges, more than the weak differences, which usually represent the texture.

The edge strength of the block is determined by the following equation:

$$W=\Sigma f(x,y) \quad (2)$$

where the summation is over the 8×8 pixel block.

The determined edge strength W is measured against a pre-chosen threshold. (FIG. 3, step S4). A block with weighted edge strength in excess of the threshold contains a major edge. If the edge strength does not exceed the pre-chosen threshold, the block is discarded, and a subsequent block is examined (FIG. 3, step S5).

If it is determined that a block contains an edge, before it can be compared (matched) with the stored templates, the orientation of the edge must be determined (FIG. 3, step S6).

Estimation of edge orientation (FIG. 3, step S6) will now be described with reference to FIG. 4. For the detector to properly determine counterfeiting, orientation estimation must be reliable and relatively accurate. In the present invention, a method based on second order moments is utilized, which is accurate and robust to noise.

Figure 4:
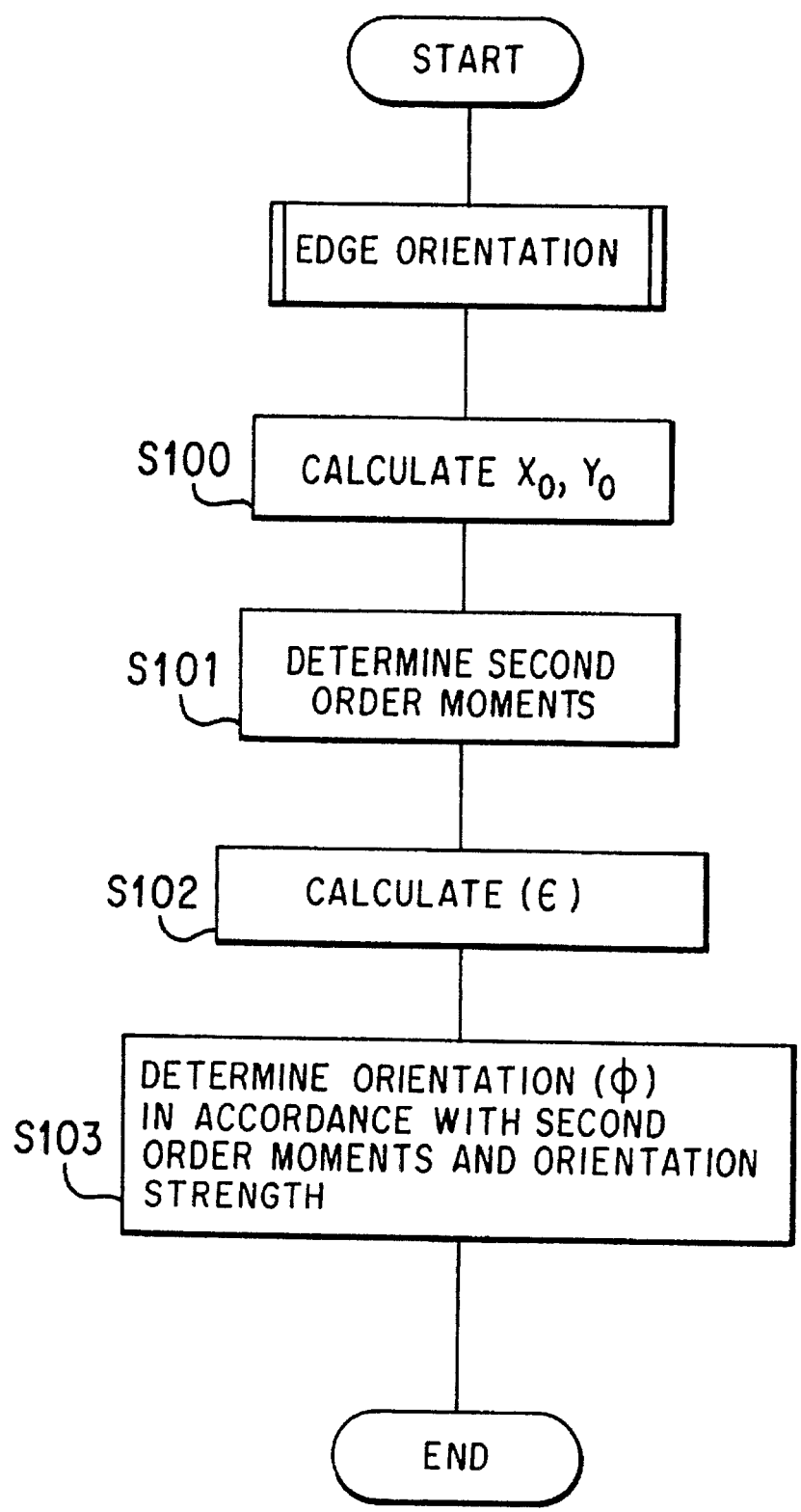
FIG. 4 is a flowchart illustrating orientation estimation according to the invention.

First, a candidate for the anchor point is found by calculating $$x_0=[\Sigma f(x,y)x]/W$$

and $$y_0=[\Sigma f(x,y)y]/W \quad (3)$$

where the summations are over the 8×8 block (FIG. 4, step S100). The orientation of the edge is then evaluated using the following equation (FIG. 4, step S103):

$$\phi=\theta+0.5\pi, \text{ if } \epsilon>0.5;$$

$$\theta, \text{ otherwise}, \quad (4)$$

where $$\theta=0.5 \tan^{-1}[2M_{xy}/(M_x M_y)] \quad (5)$$

and $M_x$, $M_y$ and $M_{xy}$ refer to second order moments defined as (FIG. 4, step S101):

$$M_x=\Sigma f(x,y)(x-x_0)^2$$

$$M_y=\Sigma f(x,y)(y-y_0)^2$$

and $$M_{xy}=\Sigma f(x,y)(x-x_0)(y-y_0) \quad (6)$$

The summation spans a circular area centered at $(x_0,y_0)$ with a diameter of 8 pixels. $\epsilon$ is defined as (FIG. 4, step S102):

$$\epsilon=(M_x \sin^2\theta+M_y \cos^2\theta+2M_{xy}\sin\theta\cos\theta)/(M_x+M_y) \quad (7)$$

where $\epsilon$ ranges from 0 to 1.

Once the orientation is determined, comparison between the unknown document portion and the templates can be performed (FIG. 3, step S7). The templates are first rotated before matching in accordance with the determined orientation so that the axis of the anchor point aligns with the major direction of the block. The rotation is performed in a conventional manner by:

$$x'=x \cos\phi+y \sin\phi$$

and $$y'=-x \sin\phi+y \cos\phi \quad (8)$$

where (x, y) and (x', y') are the coordinates of a pixel before and after rotation, respectively and $\phi$ is the determined angle.

Figure 1A:
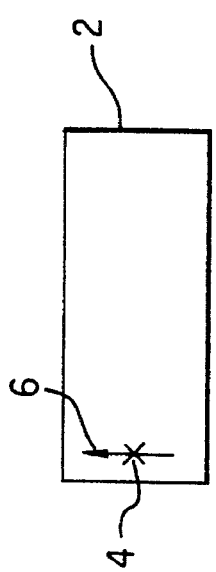
FIGS. 1A–D illustrate matching a template to a detected sample.
Figure 1C:
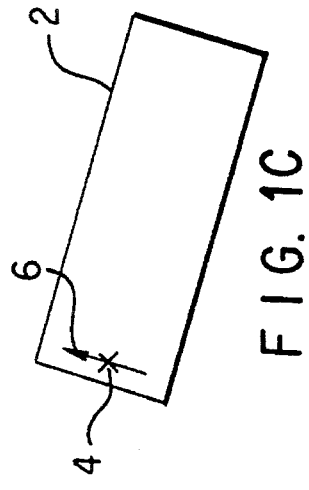
Figure 1B:
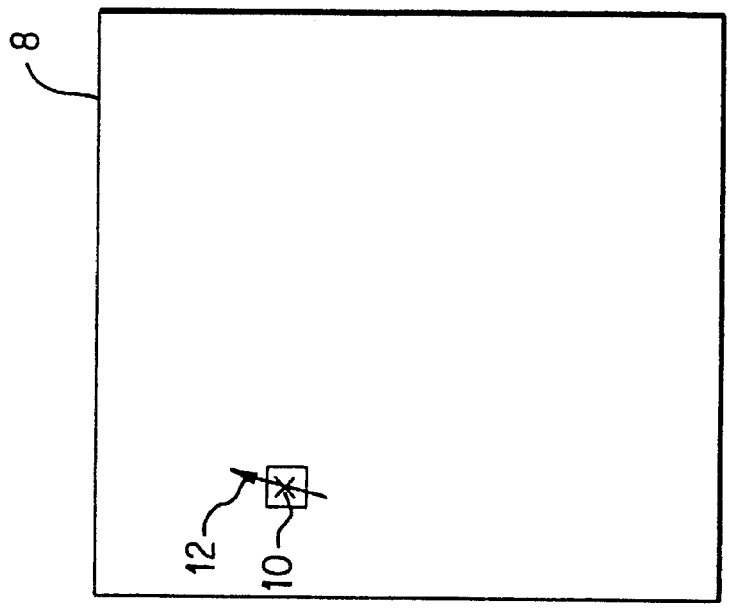
Figure 1D:
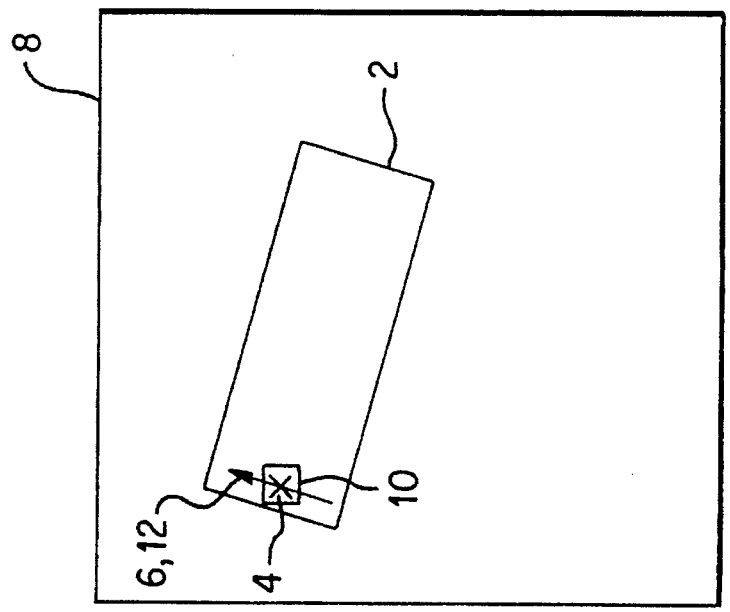

Known image comparison means can be employed to compare the block with the anchor points on the templates. By way of example, FIG. 1A illustrates a template 2 containing a pre-chosen anchor point 4 with a known orientation 6. FIG. 1B discloses a scanned document 8 contained within a platen image containing an active block 10 with determined orientation 12. The orientation of template 2 is adjusted to match the orientation of unknown document 10. This is illustrated in FIG. 1C. Finally, template 2 is matched with document 8, as is illustrated in FIG. 1D.

The following equation may be used in matching:

$$r=\frac{\Sigma v(x,y)t(x,y)}{\sqrt{\Sigma v^2(x,y)}\sqrt{\Sigma t^2(x,y)}} \quad (9)$$

where v(x,y) and t(x,y) are intensity values at (x,y) in the smoothed platen image and template image respectively, and the summation is over the size of the template. The matching is performed on all three channels. The value of r ranges from −1 to 1, wherein 1 indicates a perfect match. A positive match is declared if r is greater than a preset threshold.

Should currency be discovered from a positive match between the template and the unknown document (FIG. 3, step S8), the photocopier or printer 28 may be deactivated or the portion of the platen image containing the unknown document may be deleted from the final printed image (FIG. 3, step S9), and the operation is terminated (FIG. 3, step S11). If no currency is discovered and there are more blocks to be examined, the operation returns to step S4 for the next block (FIG. 3, step S10); otherwise, the operation is terminated (FIG. 3, step S11).

As counterfeiting is generally an irregular occurrence, the probability of a negative matching result is far greater than that of a positive one. To save computation, the matching is performed hierarchically, from several points to the entire template and from a low resolution to a high resolution. (The "high resolution" is a relative term. It is typically about 16 pixels per inch.) This enables an abort of a test if a mismatch is perceived at an early stage. In most cases, fairly reliable results can be obtained at low resolutions. High resolution is merely used for final verification.

The edge orientation estimation also provides an estimated translation along the normal direction. Furthermore, template matching at low resolution is insensitive to small shifts. As a result, no translation compensation is necessary at low resolution. Should a high resolution matching be necessary, which is likely seldom, either a translation shift is estimated or the matching is performed for several different translations.

Applying more anchor points can increase the detection reliability. Roughly speaking, the miss detection rate is $p^n$ for n anchor points, where p is the miss detection rate for a single anchor point.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

For example, if the currency to be detected are limited to a relatively small set, for example, U.S. dollars only, more sophisticated anchor points such as corner points can be used to increase the efficiency of the process. Other variations include different template matching techniques, different edge orientation estimation methods, and different schemes for combination of anchor points. Such variations may effect reliability, complexity, speed, and the constraints on the patterns to be detected.

What is claimed is:

1. An anti-counterfeit detector for detecting whether an image to be photocopied is a currency note, the detector comprising:

storage means for storing a plurality of templates, each of said plurality of templates comprising at least one predetermined anchor point;

examining means for examining a portion of said image to be photocopied and for determining whether said portion contains a predetermined pixel intensity arrangement, wherein said predetermined pixel intensity arrangement is an edge and said examining means comprises means for calculating edge strength within said portion in accordance with the following equations:

$$f(x,y)=|d_V|^3(x,y)+|d_H|^3(x,y)$$

and $$W=\Sigma f(x,y)$$

where $d_V$ and $d_H$ are differences in intensity of neighboring pixels in vertical and horizontal directions respectively, W is edge strength and summation is over said portion;

orientation determining means for determining an orientation of said predetermined pixel intensity arrangement;

positioning means for positioning said plurality of templates in alignment with said predetermined pixel intensity arrangement in accordance with said orientation determined by said orientation determining means;

matching means for comparing said plurality of templates to said predetermined pixel intensity arrangement.

2. An anti-counterfeit detector according to claim 1, wherein if said edge strength does not exceed a predetermined threshold, said portion is discarded.

3. An anti-counterfeit detector according to claim 1, wherein said orientation determining means comprises means for determining edge orientation φ in accordance with the following equations:

$$x_0=\{\Sigma f(x,y)x\}/W$$

and $$y_0=\{\Sigma f(x,y)y\}/W$$

wherein x and y are the coordinates of each of said pixel intensity arrangement, $$f(x,y)=|d_V|^3(x,y)+|d_H|^3(x,y),$$ where $d_V$ and $d_H$ are differences in intensity of neighboring pixels of said pixel intensity arrangement, $W=\Sigma f(x,y)$ over said pixel intensity arrangement, and $$\phi=\theta+0.5\pi, \text{ if } \epsilon\geq0.5$$

and $$\phi=\theta \text{ if } \epsilon<0.5$$

where $$\theta=0.5\tan^{-1}(2M_{xy}/M_xM_y)$$

$$\epsilon=(M_x\sin^2\theta+M_y\cos^2\theta+2M_{xy}\sin\theta\cos\theta)/(M_x+M_y)$$

where $M_x$, $M_y$ and $M_{xy}$ refer to second order moments defined as $$M_x=\Sigma f(x,y)(x-x_0)^2$$

$$M_y=\Sigma f(x,y)(y-y_0)^2$$

and $$M_{xy}=\Sigma f(x,y)(x-x_0)(y-y_0)^2$$

and summation is over a circular area preselected diameter center at $(x_0,y_0)$.

4. An anti-counterfeit detector according to claim 3, wherein said preselected diameter is 8 pixels.

5. An anti-counterfeit detector according to claim 4, wherein said positioning means comprises means for rotating said template according to the following equation:

$$x'=x\cos\phi+y\sin\phi$$

and $$y'=-x\sin\phi+y\cos\phi$$

where (x,y) and (x',y') are coordinates of a pixel before and after rotation respectively.

6. An anti-counterfeit detector according to claim 1, wherein said matching means further comprises means for determining matching strength r in accordance with the following equation:

$$r=\frac{\Sigma v(x,y)t(x,y)}{\sqrt{\Sigma v^2(x,y)}\sqrt{\Sigma t^2(x,y)}}$$

where v(x,y) and t(x,y) are intensity values at (x,y) in the image and each of the plurality of templates, respectively, and summation is over a template size.

7. An anti-counterfeit detector according to claim 6, wherein a match is indicated by r being greater than a preset threshold.

8. An anti-counterfeit method for detecting whether an image to be photocopied is a currency note, the method comprising the steps of:

storing a plurality of templates, each of said plurality of templates comprising at least one predetermined anchor point;

examining a portion of said image to be photocopied and determining whether said portion contains a predetermined pixel intensity arrangement, wherein said predetermined pixel intensity arrangement comprises an edge and the step of examining comprises determining edge strength within said portion accordance with the following equations:

$$f(x,y)=|d_V|^3(x,y)+|d_H|^3(x,y)$$

and $$W=\Sigma f(x,y)$$

where $d_V$ and $d_H$ are differences in intensity of neighboring pixels in vertical and horizontal directions respectively, W is edge strength and summation is over said portion;

determining an orientation of said predetermined pixel intensity arrangement;

positioning said templates in alignment with said predetermined pixel intensity arrangement in accordance with said orientation determined by said orientation determination means; and comparing said plurality of templates to said predetermined pixel intensity arrangement.

9. The method according to claim 8, wherein an examined portion is discarded if its edge strength does not exceed a preselected threshold.

10. The method according to claim 8, wherein the step of determining comprises determining edge orientation $\phi$ in accordance with the following equations:

$$x_0=\{\Sigma f(x,y)x\}/W$$

and $$y_0=\{\Sigma f(x,y)y\}/W$$

wherein x and y are the coordinates of each of said pixel intensity arrangement, $f(x,y)=|d_V|^3(x,y)+|d_H|^3(x,y)$, where $d_V$ and $d_H$ are differences in intensity of neighboring pixels of said pixel intensity arrangement, $W=\Sigma f(x,y)$ over said pixel intensity arrangement, and $$\phi=\theta+0.5\pi, \text{ if } \epsilon \geq 0.5$$

and $$\phi=\theta \text{ if } \epsilon<0.5$$

where $$\theta=0.5 \tan^{-1}(2M_{xy}/M_xM_y)$$

$$\epsilon=(M_x \sin^2\theta+M_y \cos^2\theta+2M_{xy}\sin\theta\cos\theta)/(M_x+M_y)$$

where $M_x$, $M_y$ and $M_{xy}$ refer to second order moments defined as $$M_x=\Sigma f(x,y)(x-x_0)^2$$

$$M_y=\Sigma f(x,y)(y-y_0)^2$$

and $$M_{xy}=\Sigma f(x,y)(x-x_0)(y-y_0)^2$$

and summation is over a circular area preselected diameter center at $(x_0,y_0)$.

11. The method according to claim 10, wherein said preselected diameter is 8 pixels.

12. The method according to claim 10, wherein the step of aligning comprises rotation of said templates according to the following equations:

$$x'=x \cos\phi+y \sin\phi$$

and $$y'=-x \sin\phi+y \cos\phi$$

where (x,y) and (x',y') are coordinates of a pixel before and after rotation respectively.

13. The method according to claim 8, wherein the step of comparing comprises determining matching strength r in accordance with the following equation:

$$r=\frac{\Sigma v(x,y)t(x,y)}{\sqrt{\Sigma v^2(x,y)}\sqrt{\Sigma t^2(x,y)}}$$

where v(x,y) and t(x,y) are intensity values at (x,y) in a smoothed platen image and template image respectively, and summation is over template size.

14. An anti-counterfeit detector according to claim 13, wherein a match is indicated by r being greater than a preset threshold.

* * * * *